United States Patent [19]

Ono

[11] Patent Number: 4,686,134
[45] Date of Patent: Aug. 11, 1987

[54] THREE-DIMENSIONAL STRUCTURAL MEMBER
[75] Inventor: Kohtaro Ono, Fukui, Japan
[73] Assignee: Nippon Mayer Co., Ltd., Fukui, Japan
[21] Appl. No.: 812,439
[22] Filed: Dec. 23, 1985
[30] Foreign Application Priority Data Dec. 29, 1984 [JP] Japan .............................. 59-281061

[51] Int. Cl.⁴ ............................................ D03D 13/00
[52] U.S. Cl. .................................... 428/222; 428/224; 428/225; 428/105; 428/109
[58] Field of Search ............... 428/253, 254, 257, 221, 428/224, 225, 222, 105, 109

[56] References Cited

U.S. PATENT DOCUMENTS

3,904,464  9/1975  Hmg ...................................... 428/254
4,584,226  4/1986  Vitale et al. .......................... 428/113

Primary Examiner—James J. Bell
Attorney, Agent, or Firm—Jordan and Hamburg

[57] ABSTRACT

A three-dimensional structural member adapted for wide use as an industrial composite structural member such as an aircraft or other vehicle interior part. A reinforcing substrate fabric has a plurality of planar structural sections. The reinforcing substrate fabric serving as a core material is impregnated or covered with a shape retention agent such as synthetic resin or ceramic material and then solidifed to form a predetermined three-dimensional structure or, alternatively, the reinforcing substrate fabric is unfolded to form a predetermined three-dimensional structure and then impregnated or covered with the shape retention agent. The three-dimensional structural member is characterized in that the reinforcing substrate fabric is formed of lengthwise continuously arrayed yarns. Fabric areas defined by a plurality of surfaces using a plurality of groups of yarns are integrally formed. At least one group of yarns are arrayed so that they are continuous in the direction of the length, with continuity between widthwise and/or obliquely extending linear portions in the fabric areas and curved or bent portions in the ends of the fabric areas. Alternatively, at least one group of yarns are arrayed so that they are continuous in the direction of the length while continuously forming loops, the yarns being interlaced with each other and/or with the other groups of yarns which are arrayed so that they are continuous in the direction of the length. The yarns are thus connected together.

27 Claims, 16 Drawing Figures

THREE-DIMENSIONAL STRUCTURAL MEMBER

TECHNICAL FIELD

The present invention relates to a three-dimensional structural member having at least two planar structural sections and more particularly it relates to a three-dimensional structural member adapted for universal use as an industrial composite structural member, for example, an aircraft or other vehicle interior part, upholstery material or building material.

BACKGROUND OF THE INVENTION

It is important that various industrial structural members such as aircraft and other vehicle interior parts, upholstery materials and building materials be as light in weight as possible and yet retain sufficient rigidity and strength. For this reason, rather than shaping such structural member in flat or curved plate form it has been common practice to shape it as a cubic structure having a plurality of planar structural sections made continuous by crossing each other, a cubic structure, for example, in substantially T, Y, I or H form in cross-section, that is, a three-dimensional structure.

Conventionally, structural members formed of plastic forms reinforced by fiber, or so-called fiberglass reinforced plastics (FRP) have been widely utilized. However, where such structural member is formed as a three-dimensional structure having a plurality of planar structural sections, as described above, there is a problem concerning strength and durability particularly in joined portions where planar structural sections are joined together. Further, such structural member tends to produce warp or strain and when loaded it is liable to produce buckling, deformation or peeling, thus failing to provide sufficient strength.

Particularly concerning a structural member used as an aircraft or other vehicle interior part, there has been a desire for such member which is of said cubic construction resistant to bending and which is light in weight in use and can withstand continuous vibration or shock. However, said structural members formed solely of plastic material cannot meet such requirements.

For this reason, in recent years, trials have been made using a textile fabric as a reinforcing core material, impregnating it with synthetic resin, followed by molding and solidification, and then forming it into a three-dimensional cubic structural member having a substantially T-shaped or I-shaped cross-section, and various proposals have been made concerning reinforcing core materials for use therewith.

For example, Japanese Patent Application Laid-Open No. 176232/1982 discloses a technique wherein fiber groups of first direction forming warp yarn layers and fiber groups of second direction forming weft yarn layers are alternately piled in large numbers without being woven so as to form a laminar structure, said wrap and weft yarn layers being bound together to present a laminar form bisected at opposite lateral ends in the direction of the length by a third group of fibers to thereby form a fabric, said fabric being used as a reinforcing core material, which is then impregnated with resin and molded, whereupon the bifurcations are opened and the structure is solidified, thereby forming an H-shaped structure. With this technique, there is obtained a structural member having thick planar structural sections; however, since the warp and weft yarn layers are not interlaced, the two yarn layers are relatively weakly bound and particularly in the lateral edges of the fabric the widthwise arrayed weft yarn are in the broken state, resulting in the danger of the warp yarns being frayed before resin impregnation and solidification are completed, their adherence to the resin with which they are impregnated being low; thus, it is impossible to obtain sufficient mechanical strengths such as vibration resistance and shock resistance.

Further, as disclosed in Japanese Patent Application Laid-Open No. 133241/1982, there is a structure wherein in a fabric formed of warp and weft yarns crossing each other, one or both ends in the direction of the width are woven into a double fabric. However, this technique is based simply on the crossing of yarns in two directions, warp and weft, and since the weft yarns arrayed widthwise in the lateral ends of the fabric are broken, there is the danger of the warp yarns in the lateral ends being frayed during handling before resin impregnation and solidification are completed, resulting in a lack of integrality with the solidified resin; therefore, it is impossible to obtain sufficient mechanical strengths such as vibration resistance and shock resistance.

SUMMARY OF THE INVENTION

The present invention has been accomplished with the above in mind and has for its object the provision of a three-dimensional structural member which is light in weight, has rigidity and withstands tension or repeated load, wherein its substrate fabric serving as a reinforcing core material hardly becomes frayed and is superior in integrality with solidified resin, so that the structural member is superior in vibration resistance and shock resistance and is suitable for wide use as an industrial composite structural member, for example, an aircraft or other vehicle interior part.

The present invention, which has solved the aforesaid problems, provides a three-dimensional structural member having a plurality of planar structural sections wherein a reinforcing substrate fabric serving as a core material is impregnated or covered with a shape retention agent such as synthetic resin or ceramic material and is then solidified to thereby form a predetermined three-dimensional structure or said reinforcing substrate fabric is unfolded to present a three-dimensional structure and then impregnated or covered with said shape retention agent and solidified, said three-dimensional structural member being characterized in that said reinforcing substrate fabric comprises fabric areas defined by a plurality of surfaces and formed of a plurality of groups of yarns, the yarns in each group making the same movement, said fabric areas being integrally formed, wherein at least one group of yarns are continuously arrayed in the direction of the length with the continuity between linear portions extending widthwise and/or obliquely in the fabric areas and curved or bent protions in the lateral edges of the fabric areas and in the boundary between the fabric areas or are continuously arrayed in the direction of the length while continuously forming loops, and the yarns belonging to this group are interlaced with each other and/or with the yarns in another group which are continuously arrayed in the direction of the length, these groups of yarns being linked together and continuously arrayed in the direction of the length.

According to such three-dimensional structural member of the present invention, the reinforcing substrate fabric comprising fabric areas defined by a plurality of surfaces forms a structure wherein, as described above, individual yarns are continuously interlaced with each other without forming yarn ends in the widthwise lateral ends, i.e., the selvages of the fabric.

As a result, there is no danger of frays being produced in the lateral ends before the reinforcing substrate fabric is impregnated or covered with a shape retention agent such as synthetic resin, molded and solidified. Further, the yarns are intricately interlaced in the fabric areas, so that there is no danger of the meshes of the fabric being easily or excessively opened. This means that the substrate fabric itself is resistant to tension and is superior in shape retention. Further, the shape retention agent such as synthetic resin permeates the meshes of the fabric areas of yarn in the reinforcing substrate fabric, which is the core material, and is solidified in accordance with the unevenness of the surface of the substrate fabric, whereby the binding force between the substrate fabric and the shape retention agent is increased. This feature, coupled with the rigidity of the shape retention agent and the tenacity and three-dimensional construction of the reinforcing substrate fabric, provides decreased weight, rigidity, high resistance to tension and bending and also to repeated load and vibration and shock, and the necessary sufficient strength without having to increase the thickness so much. Particularly, despite the continuous configuration defined by the planar structural sections crossing each other, the reinforcing substrate fabric has its fabric areas integrally constructed in agreement with the configuration of said substrate fabric, with the result that the strength of the connecting portion of the fabric areas is increased, ensuring little possiblity of warp or strain, no danger of buckling, peeling, deformation or fracture taking place under load, satisfactory resistances to vibration and shock, and excellent durability.

Therefore, the three-dimensional structural member of the invention can be widely and exceedingly suitably used as an industrial composite structural member, such as an aircraft interior part of a building material, where resistances to vibration and shock are required. Moreover, if a plurality of the structural members are combined with each other or if the structural member is combined with some other rigid material, such combination can be used at locations where higher strength is required.

Further, since the reinforcing substrate fabric used as the core material in the invention is formed by continuously arraying yarns in the direction of the length of the substrate fabric, it is possible to obtain a long-sized continuous substrate fabric, by use of which a long-sized three-dimensional structural member can be produced. Particularly, if the reinforcing substrate fabric is produced by braiding, e.g., torchon lace, or warp knitting, the production thereof is easier and three-dimensional structures of various configurations such as T-shape and I-shape in cross-section can be produced accroding to the intended use.

DESCRIPTION OF THE PREFERRED EMBODIMENTS

Embodiments of the invention will now be described with reference to the drawings.

Figure 1:
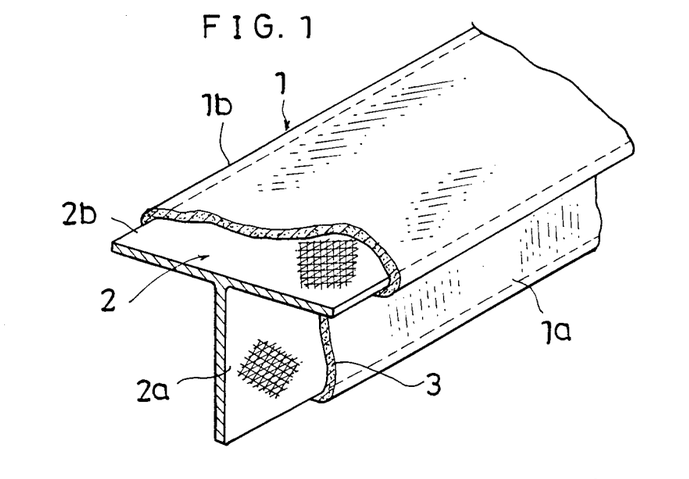
FIG. 1 is a fragmentary perspective view of a three-dimensional structural member according to an embodiment of the invention.

FIG. 1 shows a three-dimensional structural member 1 having two planar structural section 1a and 1b integrally constructed to present substantially a T-shape in cross-section. This three-dimensional structural member 1 uses as a core material a reinforcing substrate fabric 2 of long-sized three-dimensional construction having fabric areas 2a and 2b of integral construction defined by a plurality of surfaces. The reinforcing substrate fabric 2 is partly impregnated with a shape retention agent 3, such as synthetic resin, or is covered with said shape retention agent as by coating means, so as to be wrapped therewith in laminar form, the same being then molded and solidified to present a predetermined three-dimensional structure. Alternatively, said reinforcing substrate fabric 2 is unfolded to provide a predetermined three-dimensional structure and in this state it is impregnated or covered with said shape retention agent 3 and then molded and solidified.

As for said shape retention agent 3, use may be made of materials which will solidify when molded after impregnation or coating, for example, thermosetting resins such as epoxy, polyesters, phenols, vinyl esters, silicones, and acrylics, thermoplastic resins such as polyamides, polyolefins, polycarbonates, ABS, and polybutylene terephthalate, or other synthetic resins, or ceramics such as alumina and zirconia. To increase the binding force between the shape retention agent 3 of such material and the reinforcing substrate fabric 2, there may be a case where an adhesive agent is interposed between said substrate fabric 2 and said shape retention agent 3, according to the need. As for said shape retention agent 3, a composite agent consisting of a combination of two or more of said materials may be used or a laminated structure having a plurality of layers individually formed of said materials may be produced.

The reinforcing substrate fabric 2 may be formed using a yarn of ordinary fiber material or, more suitably, a yarn of so-called reinforcing fiber material, such as glass fiber, carbon fiber, aramid fiber (aromatic polyamide fiber) or reinforced plastic fiber, which exhibits less elongation and high resistance to bending. In addition, the yarns so referred to in this invention include a monofilament yarn of synthetic resin, a yarn consisting of a plurality of thin yarns twisted together, and a linear article formed of fiber.

The reinforcing substrate fabric 2 used in the invention has its fabric areas 2a and 2b integrally formed of a plurality of groups of yarns 4, 5 and 6, the yarns in the same group making the same movement (or extending in the same manner), and it can be produced by making use of braiding means, such as torchon lace, to be described below.

Figure 2:
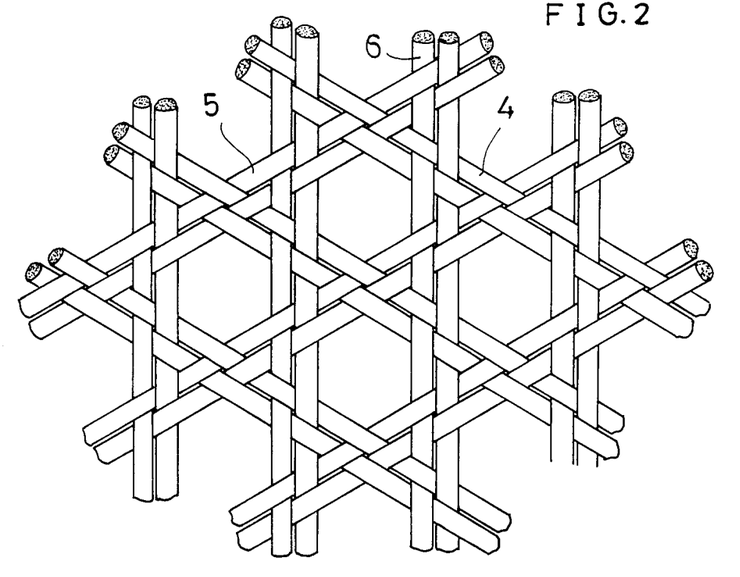
FIG. 2 is an enlarged fragmentary view showing an example of a structure when a reinforcing substrate fabric is produced by braiding means.

FIG. 2 is a fragmentary enlarged view showing an example of the basic structure of a reinforcing substrate fabric formed by braiding means. In this figure, the numerals 4 and 5 denote obliquely extending braiding yarns and 6 denotes longitudinally (weftwise) extending yarns, the braiding yarns 4, 5 and 6 in these groups being two for each group and extending in three directions to cross each other at 60 degrees.

Figure 3:
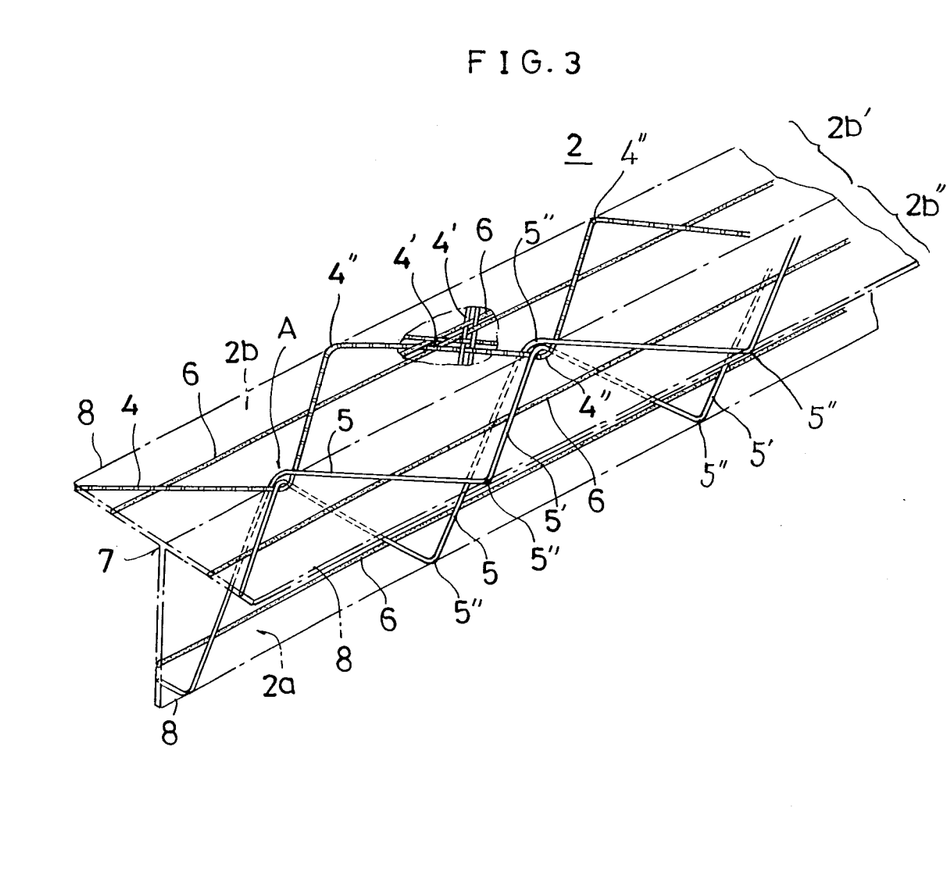
FIG. 3 is a perspective view showing the way some yarns in the reinforcing substrate fabric formed by braiding means extend.

In FIG. 3 showing a T-shaped reinforcing substrate fabric 2, there are shown three groups of braiding yarns 4, 5 and 6, with the yarns in the same group making the same movement, and of these braiding yarns, the braid yarn 4 is arrayed so that it is continuous in zigzags in the direction of the length with the continuity between an obliquely extending linear portion 4' in a half 2b' of a planar fabric area 2b and curved or bent portions 4" in the lateral end 8 of the fabric area and in the boundary 7 between the fabric areas 2a and 2b, while the braid yarn 5 is arrayed so that it is continuous in the direction of the length as it is progressively built into the fabric area 2a and the other half 2b" of the fabric area 2b with the continuity between an obliquely extending linear portion 5' and curved or bent portions 5" in the lateral end 8 and in the boundary 7, these yarns 4 and 5 being interlaced with the braid yarn 6 arrayed in the fabric areas 2a and 2b in the direction of the length. In FIG. 3, two braiding yarns 4, 4 are shown, one of which is longitudinally shifted by a half pitch. The other unillustrated yarns in each of said groups are similarly built in, whereby the reinforcing substrate fabric 2 of three-dimensional construction having a substantially T-shaped cross-section is formed. The boundary 7 between said fabric areas 2a and 2b is defined by the interlacing of the individual braiding yarns including the interlaced region A of the braiding yarns 4 and 5; the two fabric areas 2a and 2b are joined together to form an integral structure. The reinforcing substrate fabric 2 thus constructed is used as a core material, and it is impregnated with a shape retention agent 3 by suitable means or is covered therewith as by coating means and then in its state of predetermined three-dimensional structure it is molded and solidified, or alternatively, after said reinforcing substrate fabric 2 has been unfolded into its predetermined three-dimensional structure, it is impregnated or covered with said shape retention agent 3, followed by molding and solidification, whereby the three-dimensional structural member 1 of the invention is obtained.

In the case of this embodiment, since the braiding yarns 4 and 5 having the obliquely extending linear portions 4' and 5' are curved or bent and continuous in the lateral ends (selvages) of the fabric areas 2a and 2b, there is no possibility of frays being produced before impregnation with the shape retention agent 3 and solidification are completed as in the case of woven fabrics. Further, since the braiding yarns 6 are arrayed with respect to said braiding yarns 4 and 5 linearly in the direction of the length of the substrate fabric 2, the reinforcing substrate fabric 2 itself does not elongate in the direction of the length, thus adding to tensile strength in the direction of the length.

Figure 4:
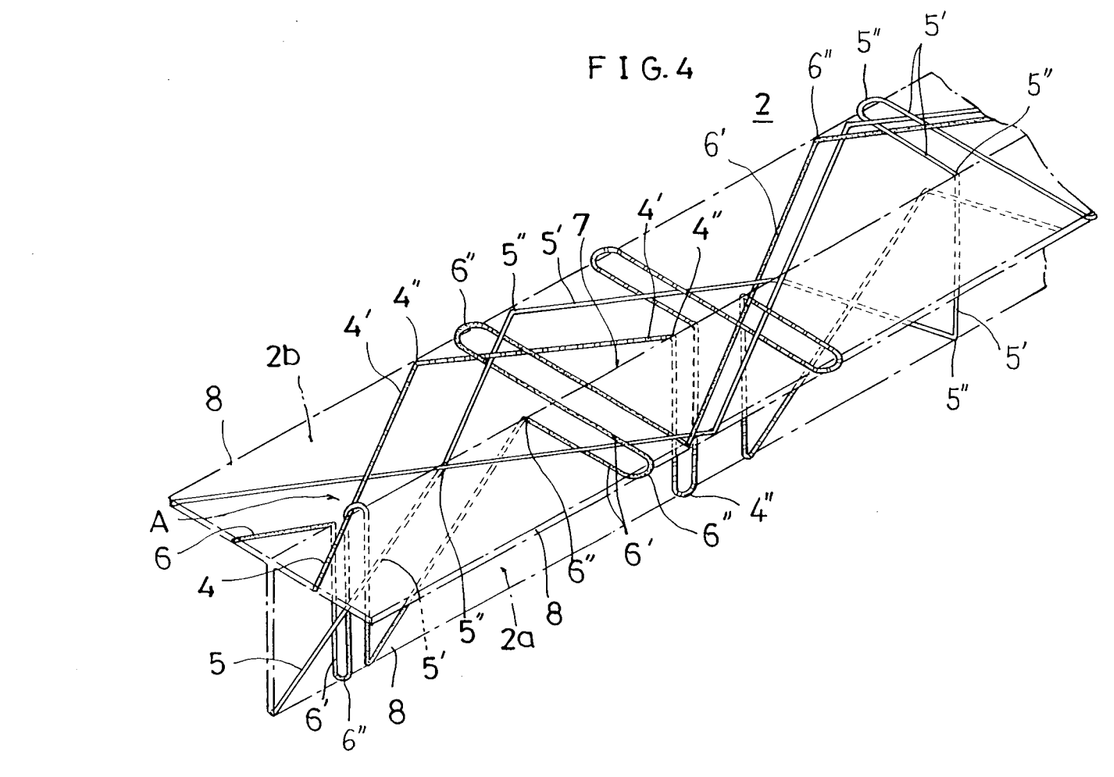
FIG. 4 is a perspective view showing the way some yarns in another reinforcing substrate fabric formed by braiding means extend.

In FIG. 4 showing another braiding condition for the reinforcing substrate fabric 2, the braiding yarns 4, 5 and 6 in the respective groups have obliquely and widthwise extending linear portions 4', 5' and 6' and are arrayed so that they are continuous in the direction of the length as they are progressively built into the fabric areas 2a and 2b with continuity between said linear portions and curved or bent portions 4", 5" and 6" in the lateral ends 8 of the fabric areas and in the boundary 7; the reinforcing substrate fabric 2 is formed by such interlacing of yarns. This braiding structure in which at least one group of yarns have widthwise extending linear portions provides a higher resistance to tension in the direction of the width.

Figure 5:
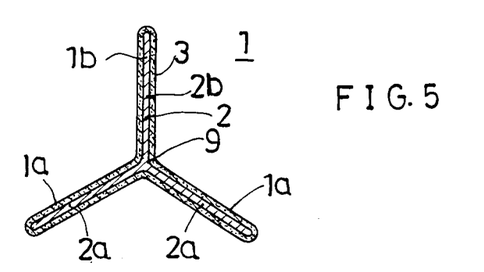
FIG. 5 is a cross-sectional view of a three-dimensional structural member according to another embodiment of the invention.

In the above embodiment, the three-dimensional structural member 1 has a substantially T-shaped cross-section. However, a three-dimensional structural member 1 of substantially Y-shaped cross-section having three planar structural sections 1a, 1a, 1b can be produced as shown in FIG. 5, wherein the reinforcing substrate fabric 2 is bent along the boundary 7 into Y form with two planar fabric areas 2a each forming an angle of 60 degrees with the other fabric area 2b and is impregnated with the shape retention agent 3 or covered therewith as by coating means, followed by molding and solidification or, alternatively, after said reinforcing substrate fabric has been impregnated or covered with the shape retention agent 3, it is bent into y form and then molded and solidified.

Figure 6:
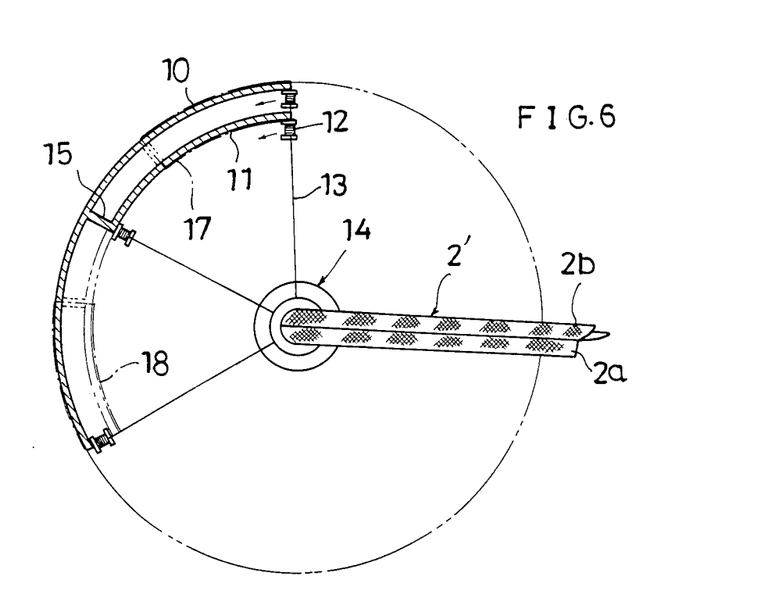
FIG. 6 is a schematic plan view showing the braiding mechanism of a torchon lace machine for braiding a reinforcing substrate fabric.
Figure 7:
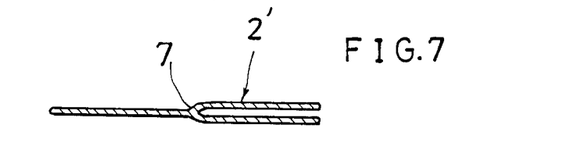
FIG. 7 is a sectional view of a reinforcing substrate fabric braided by said device.

The braiding of the aforesaid reinforcing substrate fabric 2 can be effected using, for example, a torchon lace machine disclosed in the present applicant's Japanese Patent Application No. 20760//1983 (Japanese Patent Application Laid-Open No. 150150/1984), i.e., a torchon lace knitting machine having two tracks for moving bobbins of braid yarn. The braiding condition thereof will now be described with reference to FIG. 6 showing, in plan view, an outline of the braiding mechanism of said machine. The numeral 10 denotes an upper track and 11 denotes a lower track, these tracks being disposed one above the other in a direction at right angles to the paper. A desired number of bobbins 12 are installed on each of the tracks 10 and 11 so that they can be moved along the tracks. Braiding yarns 13 are withdrawn from the bobbins 12 and braided by a braiding section 14 at the center of the machine, whereby a fabric 2', as shown in FIG. 7, is formed which is of cross-sectional construction having a single portion and a double portion and which can be formed into substantially T- or Y-shaped cross-sectional configuration, said double portion being suitably unfolded to provide a reinforcing substrate fabric 2 forming a desired three-dimensional structure as shown in FIGS. 3 or 4. This reinforcing substrate fabric 2, as described above, comprises two surfaces, the fabric areas 2a and 2b, wherein at least one group of yarns in the braiding yarns 13 of FIG. 6 are progressively built into the two fabric areas 2a and 2b with continuity between widthwise and/or obliquely extending linear portions in the two fabric areas 2a and 2b and curved or bent portions in the lateral ends 8 of the fabric areas and in the boundary 7, or they are continuously braided in the direction of the length as they are interlaced with yarns from the other fabric area in the vicinity of the boundary 7 and thereby bound. The fabric area 2a is formed of yarns from the bobbins 12 traveling along the track 10 while the fabric area 2b is formed of yarns from the bobbins 12 traveling along the track 11, and the fabric areas 2a and 2b are connected together by the bobbins 12 crossing a connecting track 15, whereby the boundary 7 is formed. The thus obtained substrate fabric 2 of cubic construction is impregnated or covered with a shape retention agent 3 such as synthetic resin, as described above, and then molded and solidified so as to form a predetermined three-dimensional structure, or said reinforcing substrate fabric 2 is changed into a predetermined three-dimensional structure and then it is impregnated or covered with the shape retention agent and solidified, whereby a three-dimensional structural member 1 having a plurality of planar structural sections 1a and 1b, as shown in FIG. 1 or 5, is obtained.

Figures 8, 9:
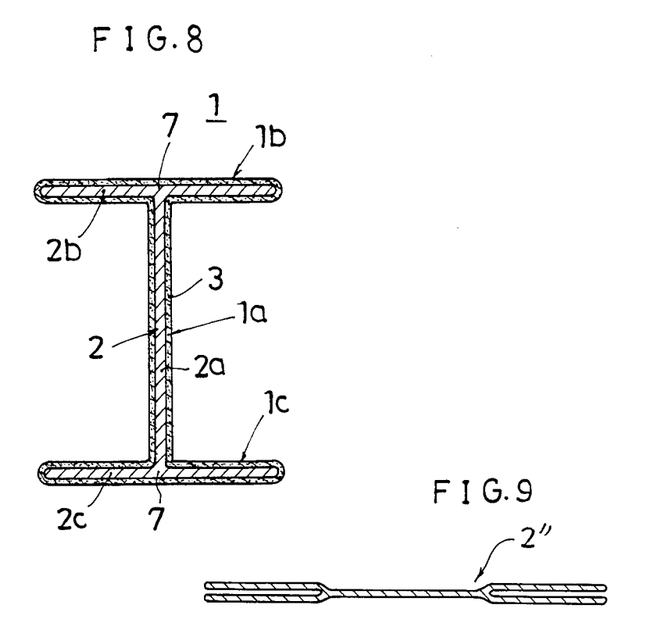
FIG. 8 is a cross-sectional view of a three-dimensional structural member according to a further embodiment of the invention.
FIG. 9 is a sectional view of a reinforcing substrate fabric used for the structural member of the preceding figure.

FIG. 8 shows a three-dimensional structural member 1 having three planar structural sections 1a, 1b and 1c according to the invention. A reinforcing substrate fabric 2, which is a core material, is obtained by braiding a fabric 2" having a single portion in the middle of the width and double portions one at each end, as shown in FIG. 9, by using a torchon lace, machine similar to the one described above or by using portions 17 and 18 of the lower track 11 surrounded with phantom lines in FIG. 6, and then unfolding the double portions of said fabric 2" each into the same plane, whereby it is formed into a structure of I-shaped cross-section, as shown in FIGS. 10 and 11, having fabric areas 2a, 2b and 2c defined by three surfaces.

Figure 10:
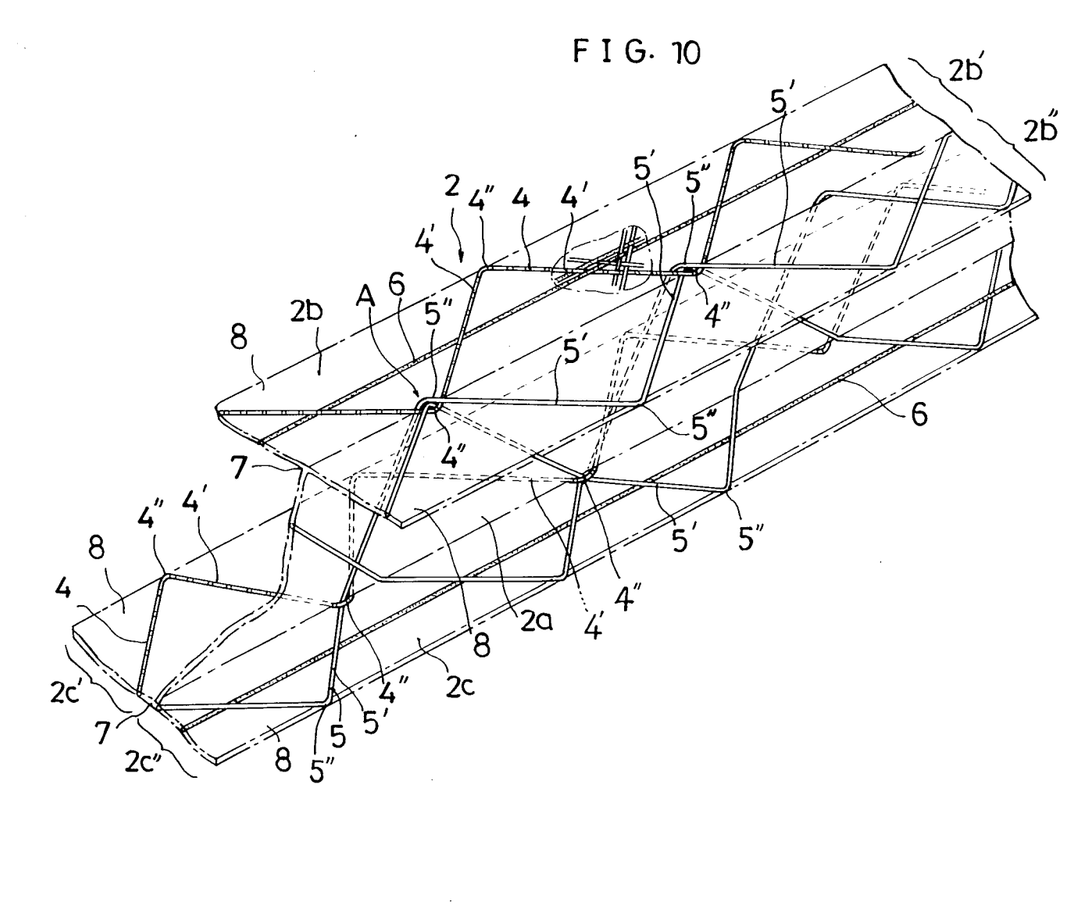
FIGS. 10 and 11 are perspective views showing the way some yarns in the reinforcing substrate fabric of the preceding figure extend.

The reinforcing substrate fabric 2 shown in FIG. 10 is constructed of the four groups of braid yarns 4, 4, 5, 6, the braid yarns 4, 4 are built in with continuity between obliquely extending linear portions 4', 4' in halves 2b' and 2c' of fabric areas 2b and 2c and curved or bent portions 4", 4" in the ends 8 of the fabric areas and in the boundary 7 while the braid yarn 5 is progressively built into halves 2b" and 2c" of the fabric areas 2b and 2c and into the fabric area 2a with the continuity between obliquely extending linear portions 5' and curved or bent portions 5" in the ends 8 of the fabric areas and in the boundary 7, said yarns 4,4 and 5 being made continuous in the direction of the length and being interlaced with yarns 6 lengthwise linearly arrayed in the fabric areas 2a, 2b and 2c, the unillustrated yarns in the respective groups being likewise braided, thereby providing a three-dimensional structure of substantially I-shaped cross-section. The linear braiding yarns 6 are not shown on the fabric area 2a for the sake of simplicity. The boundary 7 between said fabric areas 2a, 2b and 2c is bound by the interlacing of the braid yarns 4 and 5. In this case, the resistance to tension in the direction of the length is further increased.

Figure 11:
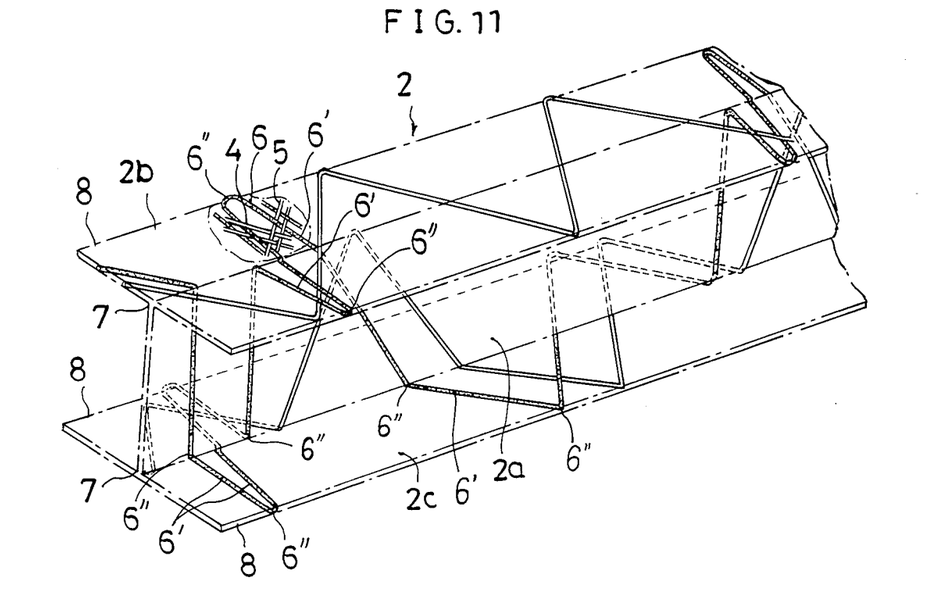

In the reinforcing substrate fabric 2 shown in FIG. 11, of the braid yarns 4, 5 and 6 interlaced in three direction in the fabric areas 2a, 2b and 2c, the yarn 6 in at least one group has obliquely and widthwise extending linear portions 6' in the fabric areas 2a, 2b and 2c and is progressively built into the fabric areas 2a, 2b and 2c with continuity between said linear portions 6' and curved or bent portions 6" in the ends 8 of the fabric areas and in the boundary 7, the yarns being braided so that they are continuous in the direction of the length. The braiding arrangement in which at least one group of yarns have widthwise extending linear portions provides a greater resistance to tension in the direction of the width.

Each of these reinforcing substrate fabrics 2 is impregnated with the shape retention agent, such as synthetic resin, or is covered therewith as by coating means, and then molded and solidified so that it forms a predetermined three-dimensional structure or, alternatively after said reinforcing substrate fabric 2 has been unfolded to provide a predetermined three-dimensional structure, it is impregnated or covered with the shape retention agent and then solidified, whereby a three-dimensional structural member 1 as shown in FIG. 8 is obtained. In the thus constructed structural member 1 also, since the reinforcing substrate fabric 2 is formed of only those yarns which are continuous in the direction of the length, that is, since the yarns are curved or bent at the lateral ends of the fabric areas and are continuous, there is no danger of the substrate fabric itself being frayed before the shape retention agent is solidified.

Figure 12:
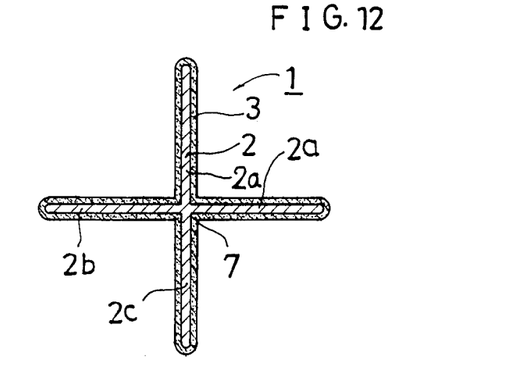
FIG. 12 is a cross-sectional view showing a three-dimensional structural member according to another embodiment of the invention.

The reinforcing substrate fabric 2 can be made in the form of a three-dimensional structure which can be unfolded into one shown in FIG. 12, by using the connecting track 15 to cause the connecting portions of the fabric to coincide with each other. In this case, the fabric areas 2a and 2b, 2c are constructed by the upper and lower tracks 10 and 11, respectively. Thus, the reinforcing substrate fabric 2 can be changed into a cubic structure of x- or +-shaped cross-section by unfolding the double portions of the fabric. In the case of this reinforcing substrate fabric also, as in the above-described cases, the substrate fabric 2 is impregnated with the shape retention agent, such as synthetic resin, or impregnated therewith as by coating means and then it is molded and solidified to provide a predetermined three-dimensional structure or, alternatively, after this reinforcing substrate fabric has been unfolded into a predetermined three-dimensional structure, it is impregnated or covered with the shape retention agent 3 and is solidified, a three-dimensional structure member 1 such as shown in FIG. 12 is obtained.

Figures 13, 14:
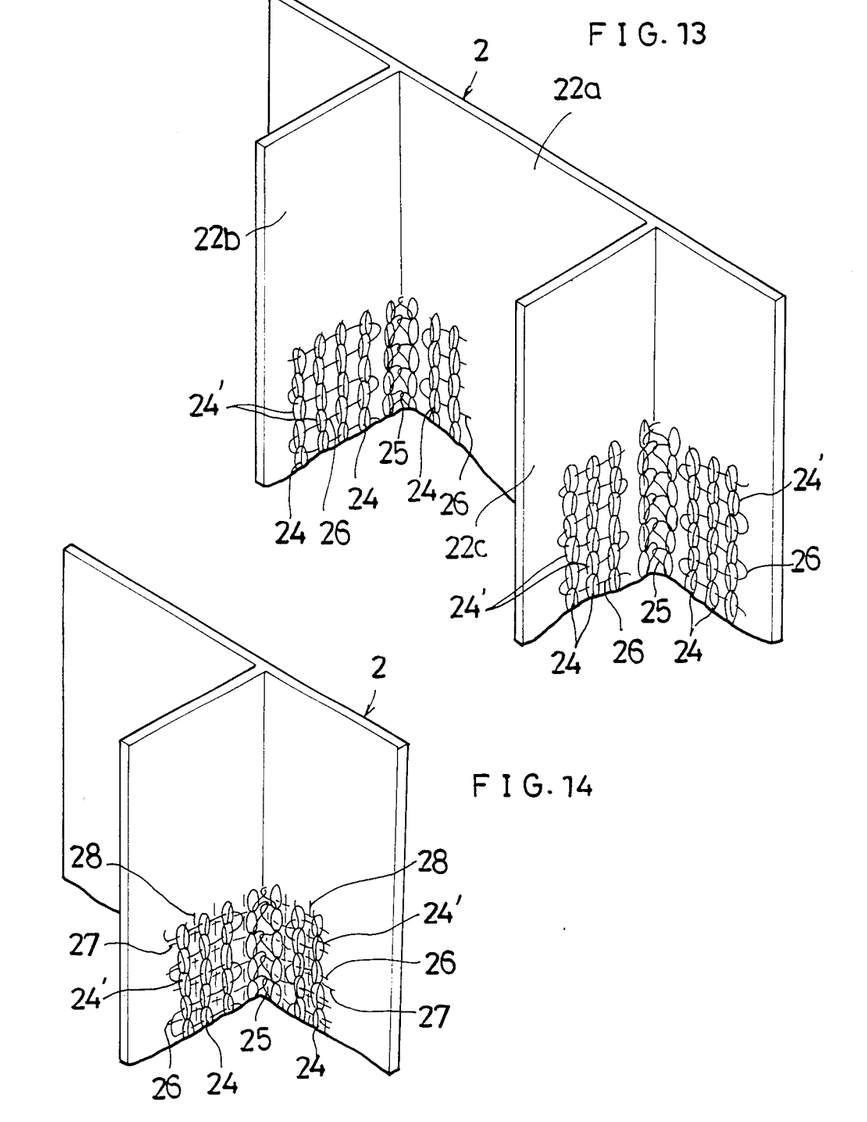
FIGS. 13 and 14 are schematic perspective views showing reinforcing substrate fabric formed by warp knitting.

The reinforcing substrate fabrics 2 are not limited to those constructed by braiding means described above but can be constructed by other means, such as warp knitting, using only those yarns which are lengthwise continuously arrayed. For example, as shown in FIG. 13, at least one group of yarns 24 are arrayed so that they are continuous in the direction of the length while forming continuously forming loops 24' in fabric areas 22a, 22b and 22c, said loop-forming yarns 24 being connected together or connected to lengthwise extending insert yarns 26 inserted over a plurality of wales into the loops of said yarns 24, whereby a warp knitted fabric having two or more fabric areas 22a, 22b and 22c is obtained; this warp knitted fabric can be used as a reinforcing substrate fabric 2. The numeral 25 denotes the portions where the yarns 24 are connected together, said portions forming the boundaries of the fabric areas. When such warp knitted fabric is used as a reinforcing substrate fabric, as shown in FIG. 14, in addition to said loop-forming yarns 24 and insert yarns 26, it is possible to insert linear weft yarns 27 extending at right angles to the wales of loops and/or linear warp yarns 28 extending lengthwise (warpwise) between the wales of loops; in this case, the tensile strength of the substrate fabric is increased.

This fabric is usually knitted by the so-called double Raschel machine having two rows of knitting needles; when the fabric configured as shown in FIG. 13 or 14 is to be produced, a portion or portions of required width at one or both ends are double knitted using the front and rear rows of knitting needles while the other portions are continuously single knitted by transferring yarns to the front and rear rows of needles. By suitably unfolding the thus knitted double portion or portions, a substrate 2 of substantially I-, Y- or T-shaped cross-section can be obtained. The thus obtained reinforcing substrate fabric is impregnated with the shape retention agent 3, such as synthetic resin, or covered therewith as by coating means and then molded and solidified to provide a predetermined three-dimensional structure or, alternatively, said reinforcing substrate fabric 2 is brought into the state of a predetermined three-dimensional structure and then impregnated or covered with the shape retention agent 3 and further molded and solidified, whereby a three-dimensional structural member similar to one shown in FIG. 1, 5, 8 or 11 can be obtained. In this case also, since the loop-forming yarns 24 and the insert yarns 26 inserted into the loops are continuous in the direction of the length, unlike a fabric in which warp and weft yarns are only interlaced, the reinforcing substrate fabric hardly frays, has superior integrality and is more firmly bound with the shape retention agent.

Figure 15:
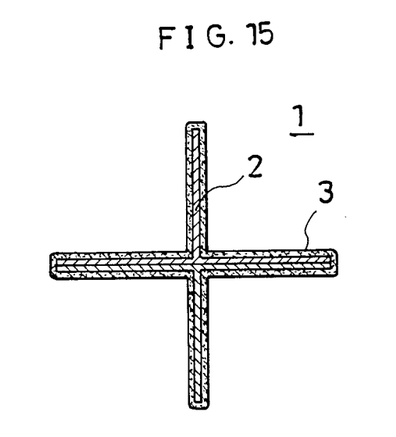
FIGS. 15 and 16 are cross-sectional views of reinforcing substrate fabrics according to other embodiments of the invention.
Figure 16:
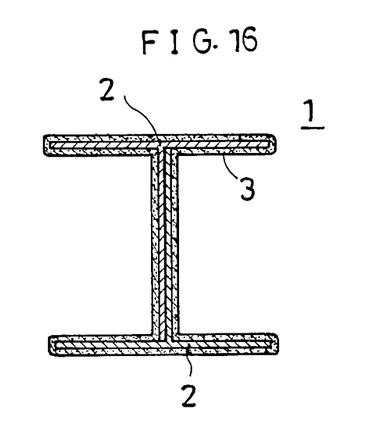

Further, according to the invention, a plurality of said reinforcing substrate fabrics 2, as shown in FIG. 15 or 16, may be contacted with each other at one of their respective fabric areas to form a single core material, which is then impregnated or covered with the shape retention agent 3, such as synthetic resin, followed by molding and solidification. The invention can be embodied with other unillustrated forms of three-dimensional structure.

What is claimed is:

1. A three-dimensional structural member comprising a plurality of planar structural sections intersecting to form a cross section having a plurality of legs, each leg corresponding to a respective one of said planar structural sections, said plurality of planar structural sections forming a reinforcing substrate fabric serving as a core material for said structural member, and a shape retention agent solidified around said reinforcing substrate fabric, said reinforcing substrate fabric comprising a plurality of fabric areas, each fabric area constituting one of said planar structural sections, said fabric areas being integrally formed by braiding means, each said fabric area comprising at least first and second groups of yarns, the first group of yarns being arrayed straight in a longitudinal direction of said three-dimensional structural member, the second group of yarns a plurality of times extending in each said fabric area widthwise or obliquely with respect to the longitudinal direction of said structural member, turning at one widthwise end of each said fabric area, returning widthwise or obliquely, reaching a boundary with another fabric area, interlacing at said boundary with yarns of said another fabric area, and further extending towards another widthwise end of said each fabric area, whereby said yarns of said second group are ultimately arrayed substantially in a lengthwise direction in said each fabric area and are interlaced with said first group of yarns.

2. A three-dimensional structural member as set forth in claim 1, wherein said yarns of said second group consist of first and second sub-groups of yarns, the first sub-group of yarns turning at the boundary with said another fabric area to interlace with the yarns of said another fabric area and extending back towards a widthwise end of said each fabric area.

3. A three-dimensional structural member as set forth in claim 1, wherein said yarns of said second group consist of first and second sub-groups of yarns, the second sub-group of yarns turning at the boundary with said another fabric area and further extending into said another fabric area.

4. A three-dimensional structural member as set forth in claim 1, wherein the cross-section of said plurality of said planar structural sections forms a T-shape.

5. A three-dimensional structural member as set forth in claim 1, wherein the cross-section of said plurality of said planar structural sections forms a Y-shape.

6. A three-dimensional structural member as set forth in claim 1, wherein the cross-section of said plurality of said planar structural sections forms an H-shape.

7. A three-dimensional structural member as set forth in claim 1, wherein said braiding means is a torchon lace machine.

8. A three-dimensional structural member as set forth in claim 1, wherein said shape retention agent is selected from the group consisting of a synthetic resin and a ceramic material.

9. A three-dimensional structural member comprising a plurality of planar structural sections intersecting to form a cross-section having a plurality of legs, each leg corresponding to a respective one of said planar structural sections, said plurality of planar structural sections forming a reinforcing substrate fabric serving as a core material for said structural member, and a shape retention agent solidified around said reinforcing substrate fabric, said reinforcing substrate fabric comprising a plurality of fabric areas, each fabric area constituting one of said planar structural sections, said fabric areas being integrally formed by braiding means, each said fabric area comprising at least first, second and third groups of yarns, each said group of yarns a plurality of times extending in each said fabric area widthwise or obliquely with respect to a longitudinal direction of said structural member, turning at one widthwise end of each said fabric area, returning widthwise or obliquely, reaching a boundary with another fabric area, interlacing at said boundary with yarns of said another fabric area, and further extending in said each fabric area towards another widthwise end thereof, whereby said first group of yarns are arrayed ultimately substantially in the lengthwise direction in said reinforcing substrate fabric, and further whereby said first, second and third groups of yarns are interlaced with each other in each said fabric area.

10. A three-dimensional structural member as set forth in claim 9, wherein the cross-section of said plurality of said planar structural sections forms a T-shape.

11. A three-dimensional structural member as set forth in claim 9, wherein the cross-section of said plurality of said planar structural sections forms a Y-shape.

12. A three-dimensional structural member as set forth in claim 9, wherein the cross-section of said plurality of said planar structural sections forms an H-shape.

13. A three-dimensional structural member as set forth in claim 9, wherein said braiding means is a torchon lace machine.

14. A three-dimensional structural member as set forth in claim 9, wherein said shape retention agent is selected from the group consisting of a synthetic resin and a ceramic material.

15. A three-dimensional structural member comprising a plurality of planar structural sections intersecting to form a cross-section having a plurality of legs, each leg corresponding to a respective one of said planar structural sections, said plurality of planar structural sections forming a reinforcing substrate fabric serving as a core material for said structural member, and a shape retention agent solidified around said reinforcing substrate fabric, said reinforcing substrate fabric comprising a plurality of fabric areas, each fabric area constituting one of said planar structural sections, said fabric areas being integrally formed by warp knitting, each said fabric area comprising at least first and second groups of yarns, the yarns of said first group in each said fabric area forming a plurality of rows of continuous loops in a longitudinal direction of said reinforcing substrate fabric, the yarns of said second group being inserted over a plurality of wales back and forth across the rows and through the loops of said first group of yarns thereby ultimately being laid-in substantially in the longitudinal direction of said reinforcing substrate fabric, the yarns of said first group of yarns being interlaced with each other and with yarns of said second group of yarns, whereby said first and second groups of yarns are connected to each other and said fabric areas are connected to each other.

16. A three-dimensional structural member as set forth in claim 1, wherein said reinforcing substrate fabric serving as a core material is covered with said shape retention agent and then solidified to form a predetermined three-dimensional structure.

17. A three-dimensional structural member as set forth in claim 1, wherein said reinforcing substrate fabric is unfolded to form a predetermined three-dimensional structure and then covered with said shape retention agent and solidified.

18. A three-dimensional structural member as set forth in claim 1, wherein the cross-section of said plurality of planar structural sections forms an I-shape.

19. A three-dimensional structural member as set forth in claim 1, wherein said reinforcing substrate comprises four planar structural sections having a cross section forming a cross-shape.

20. A three-dimensional structural member as set forth in claim 9, wherein said reinforcing substrate fabric serving as a core material is covered with said shape retention agent and then solidified to form a predetermined three-dimensional structure.

21. A three-dimensional structural member as set forth in claim 9, wherein said reinforcing substrate fabric is unfolded to form a predetermined three-dimensional structure and then covered with said shape retention agent and solidified.

22. A three-dimensional structural member as set forth in claim 9, wherein the cross-section of said plurality of planar structural sections forms an I-shape.

23. A three-dimensional structural member as set forth in claim 9, wherein the reinforcing substrate comprises four planar structural sections having a cross-section forming a cross-shape.

24. A three-dimensional structural member as set forth in claim 15, wherein said reinforcing substrate fabric serving as a core material is covered with said shape retention agent and then solidified to form a predetermined three-dimensional structure.

25. A three-dimensional structural member as set forth in claim 15, wherein said reinforcing substrate fabric is unfolded to form a predetermined three-dimensional structure and then covered with said shape retention agent and solidified.

26. A three-dimensional structural member as set forth in claim 15, wherein the cross-section of said plurality of planar structural sections forms an I-shape.

27. A three-dimensional structural member as set forth in claim 15, wherein said reinforcing substrate comprises four planar structural sections having a cross section forming a cross-shape.

* * * * *